(12) United States Patent
Reichert (10) Patent No.: US 7,564,617 B2
(45) Date of Patent: Jul. 21, 2009

(54) SHORT INFRARED ZOOM LENS SYSTEM

(76) Inventor: Abraham Reichert, 6 Nahal Kldron Street, Modiin 71700 (IL)

( * ) Notice: Subject to any disclaimer, the term of this patent is extended or adjusted under 35 U.S.C. 154(b) by 0 days.

(21) Appl. No.: 11/941,949

(22) Filed: Nov. 18, 2007

(65) Prior Publication Data

US 2008/0180789 A1    Jul. 31, 2008

(51) Int. Cl.
*G02B 13/14* (2006.01)
*G02B 15/14* (2006.01)

(52) U.S. Cl. .............. 359/356; 359/354; 359/676; 359/691

(58) Field of Classification Search ......... 359/350–361, 359/676–692, 738–740
See application file for complete search history.

(56) References Cited

U.S. PATENT DOCUMENTS

| | | | | |
|---|---|---|---|---|
| 6,018,414 A | * | 1/2000 | Chipper | 359/356 |
| 6,249,374 B1 | * | 6/2001 | Chipper | 359/356 |
| 6,999,243 B2 | * | 2/2006 | Chipper | 359/690 |
| 2006/0291071 A1 | * | 12/2006 | Ohtake | 359/687 |

* cited by examiner

*Primary Examiner*—Thong Nguyen
(74) *Attorney, Agent, or Firm*—Dekel Patent Ltd.; David Klein

(57) ABSTRACT

An infrared lens system including a focus section that focus infrared radiation at an image plane, and a zoom section that adjusts a desired focal length of the infrared radiation, the focus section and zoom section including a plurality of lens elements which are located along an optical axis in optical communication with each other, the focus section and zoom section each including a fixed lens fixed with respect to the optical axis and a movable lens arranged for movement along the optical axis.

14 Claims, 8 Drawing Sheets

SHORT INFRARED ZOOM LENS SYSTEM

FIELD OF THE INVENTION

The present invention relates generally to optical systems, and more particularly to a short infrared zoom lens assembly having a constant F/Number.

BACKGROUND OF THE INVENTION

Thermal imaging systems typically detect thermal radiance differences between various objects in a scene and display these differences in thermal radiance as a visual image of the scene. Thermal imaging systems are often used to detect fires, overheating machinery, planes, vehicles and people, and to control temperature sensitive industrial processes.

The basic components of a thermal imaging system generally include optics for collecting and focusing infrared radiation from a scene, an infrared detector having a plurality of thermal sensors for converting infrared radiation to an electrical signal, and electronics for amplifying and processing the electrical signal into a visual display or for storage in an appropriate medium.

Thermal imaging systems may use a variety of infrared detectors. An infrared detector is a device that responds to electromagnetic radiation in the infrared spectrum. Infrared detectors are sometimes classified into two main categories as cooled and uncooled. A cooled infrared detector is an infrared detector that must be operated at cryogenic temperatures, such at the temperature of liquid nitrogen, to obtain the desired sensitivity to variations in infrared radiation. Cooled detectors typically employ thermal sensors having small band gap semiconductors that generate a change in voltage due to photoelectron interaction. This latter effect is sometimes called the internal photoelectric effect.

Uncooled infrared detectors cannot make use of small band gap semiconductors because dark current swamps any signal at room temperature. Consequently, uncooled detectors rely on other physical phenomena and are less sensitive than cooled detectors. However, because uncooled detectors do not require the energy consumption of cooled detectors, they are the preferred choice for portable, low power applications where the greater sensitivity of cooled detectors is not needed. In a typical uncooled thermal detector, infrared photons are absorbed and the resulting temperature difference of the absorbing element is detected. Thermal detectors include a pyroelectric detector, a thermocouple, or a bolometer.

An infrared window is a frequency region in the infrared spectrum where there is good transmission of electromagnetic radiation through the atmosphere. Typically, infrared detectors sense infrared radiation in the spectral bands from 3 to 5 microns (having an energy of 0.4 to 0.25 eV) and from 8 to 14 microns (having an energy of 0.16 to 0.09 eV). The 3 to 5 micron spectral band is generally termed the "near infrared band" while the 8 to 14 micron spectral band is termed the "far infrared band." Infrared radiation between the near and far infrared bands cannot normally be detected due to atmospheric absorption of the same.

Infrared radiation is generally focused onto a thermal detector by one or more infrared lenses. Infrared lens assemblies may be classified as zoom or single field of view and as short or long over all length. A short length infrared zoom lens may employ a fixed or a variable aperture stop. A fixed aperture stop allows the infrared zoom lens to maintain a constant F/Number, and thus a constant sensitivity, over the zoom range. Short infrared zoom lenses having a fixed aperture stop, however, are typically expensive to manufacture due to the number and size of lens elements and to the materials needed to construct the lens elements.

SUMMARY OF THE INVENTION

In accordance with the present invention, a short length infrared zoom lens assembly having a constant F/Number is provided that substantially eliminates or reduces the disadvantages and problems associated with prior infrared detection systems.

In accordance with the present invention, a short length infrared zoom lens assembly is provided with a plurality of components located along an optical axis to focus infrared radiation of an object. A zoom section includes a pair of zoom lenses. A focusing section includes at least one focusing lens. An aperture stop may be located along the optical axis in a fixed location.

More specifically, the focusing lens may be located proximate to the image plane. In this embodiment, a second focusing lens may be located between the focusing lens and the zoom section. The aperture stop may be mounted close to the second focusing lens.

Important technical advantages of the present invention include, without limitation, providing a relatively low cost short length infrared zoom lens assembly having a constant F/Number, and thus a constant sensitivity, over the zoom range. In particular, the location of the aperture stop allows the lens assembly to have a constant, very fast F/Number. Thus, the present invention eliminates the cost associated with large lenses for short length applications.

There is thus provided in accordance with an embodiment of the present invention an infrared lens system including a focus section that focus infrared radiation at an image plane, and a zoom section that adjusts a desired focal length of the infrared radiation, the focus section and zoom section including a plurality of lens elements which are located along an optical axis in optical communication with each other, the focus section and zoom section each including a fixed lens fixed with respect to the optical axis and a movable lens arranged for movement along the optical axis.

In accordance with a non-limiting embodiment of the present invention, an aperture stop is fixed along the optical axis. The aperture stop is supported on one of the focus section lenses, and the aperture stop preferably has an F/number which is less than 1.6. The lenses each may have aspheric surfaces thereon.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
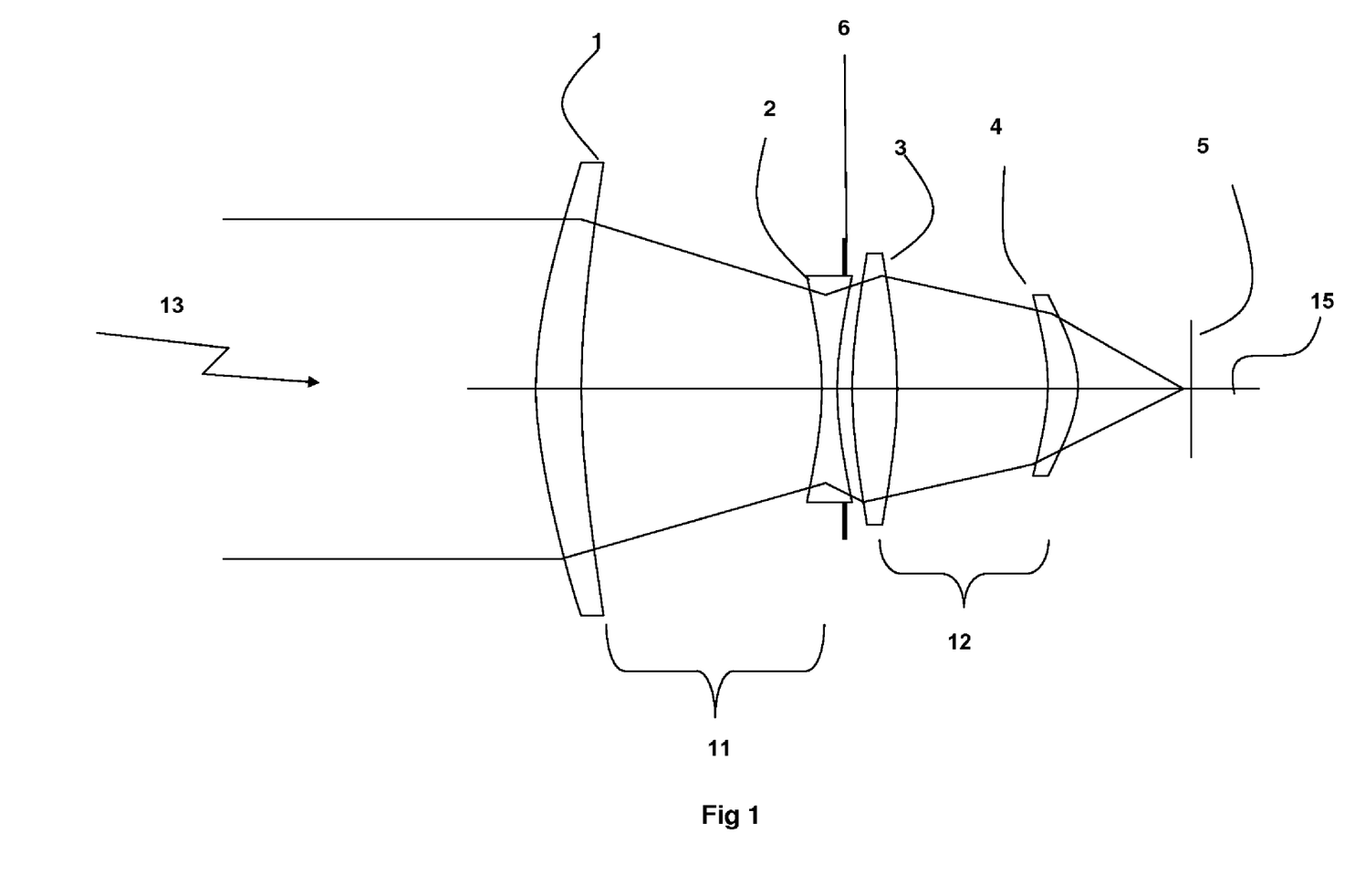
FIG. 1 is a schematic drawing of a short length infrared zoom lens assembly, constructed and operative in accordance with an embodiment of the present invention.

Reference is now made to FIG. 1, which illustrates a short length infrared zoom lens assembly, constructed and operative in accordance with an embodiment of the present invention. The short length zoom lens assembly focuses or directs infrared radiation emitted by an object 13 onto an image plane 5.

Figure 2A:
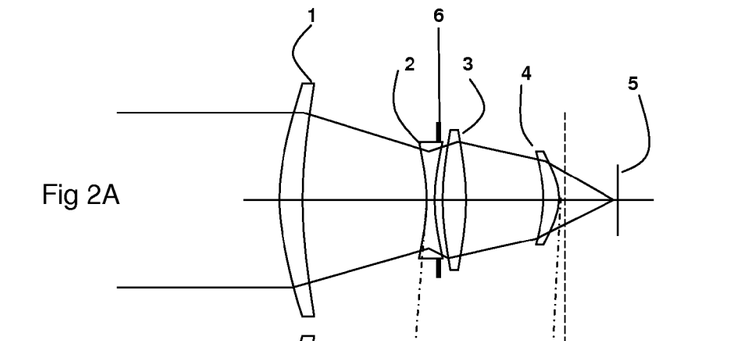
FIGS. 2A-2E are schematic drawings of the short length infrared zoom lens assembly of FIG. 1 in different zoom positions.
Figure 2B:
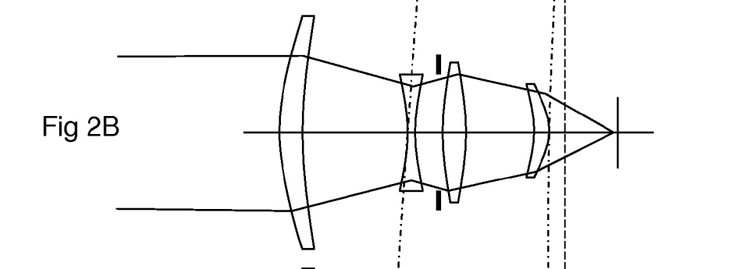
Figure 2C:
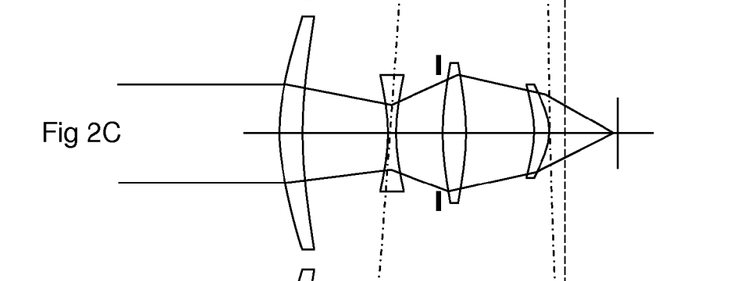
Figure 2D:
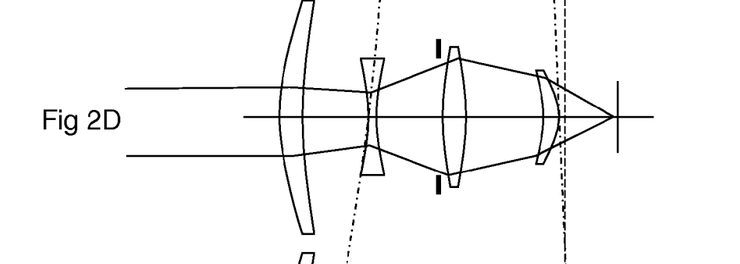
Figure 2E:
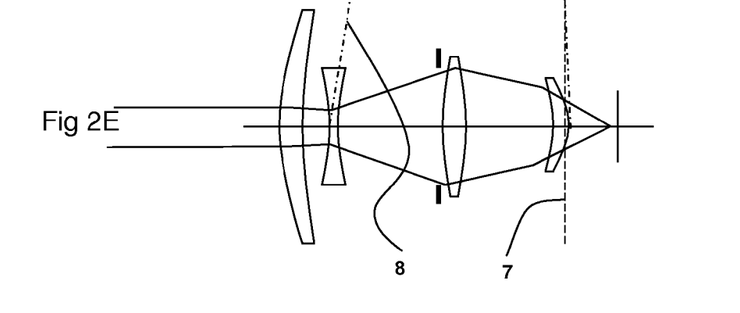
Figure 3:
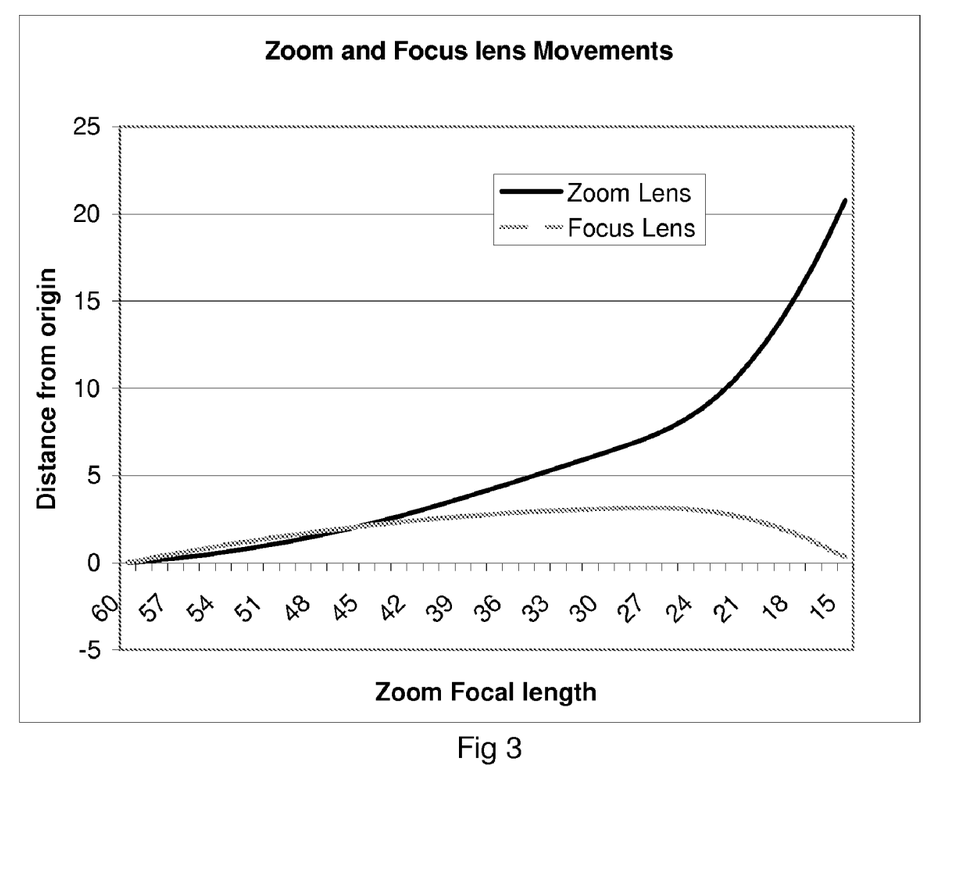
FIG. 3 is a schematic drawing of the relative movements of the zoom lens and focusing lens of FIG. 1.

In this embodiment, the short length zoom lens assembly may be generally described as a zoom lens having a retracted position shown in FIG. 2A and an extended position shown in FIG. 2E. Preferably, the zoom lens assembly is approximately 90 millimeters in overall length and operable over a horizontal field of view of ten to forty degrees (10°-40°) and yielding a 4:1 zoom ratio with a 4:3 aspect ratio. Graphs of the performance of the short length zoom lens assembly verses spatial frequency are shown for the retracted zoom position in FIG. 3A and for the extended zoom position in FIG. 3B.

As shown by FIGS. 2A-2E, the various components of the short length zoom lens assembly are positioned along an optical axis 15. The short length zoom lens assembly includes a zoom section 11 including a pair of lenses 1 and 2. Lens 1 is a fixed lens and lens 2 is a movable lens that moves to adjust the desired focal length. A focusing section 12 includes a pair of lenses 3 and 4. Lens 3 is a fixed lens and lens 4 is a movable lens that moves to keep the focus at the focal plane 5.

In accordance with conventional practice, the radius of curvature of the lens elements will be defined as positive if the center of curvature lies to the right of the lens element and will be defined as negative if the center of curvature lies to the left of the lens element along optical axis 15. A lens element will be defined as converging if the lens focusing power causes parallel light rays to converge, and will be defined as diverging if the lens focusing power causes parallel light rays to appear to originate from a virtual focus. Further, a side of a lens will be defined as a first side if facing the object 13 and will be defined as a second side if facing the image plane 15.

For the embodiment of FIGS. 2A-2E, in zoom section 11, lens 1 is a positive converging lens while lens 2 is a negative diverging lens and moves in a nonlinear fashion along line 8. As best shown by comparison of FIGS. 2A-2E, as short length zoom lens assembly is zoomed, zoom lens 2 moves away from lens 3 toward positive converging lens 1. In focusing section 12, lenses 3 and 4 are positive converging lenses, while lens 3 is fixed, and lens 4 moves in a nonlinear fashion along curved line 7.

Figure 4A:
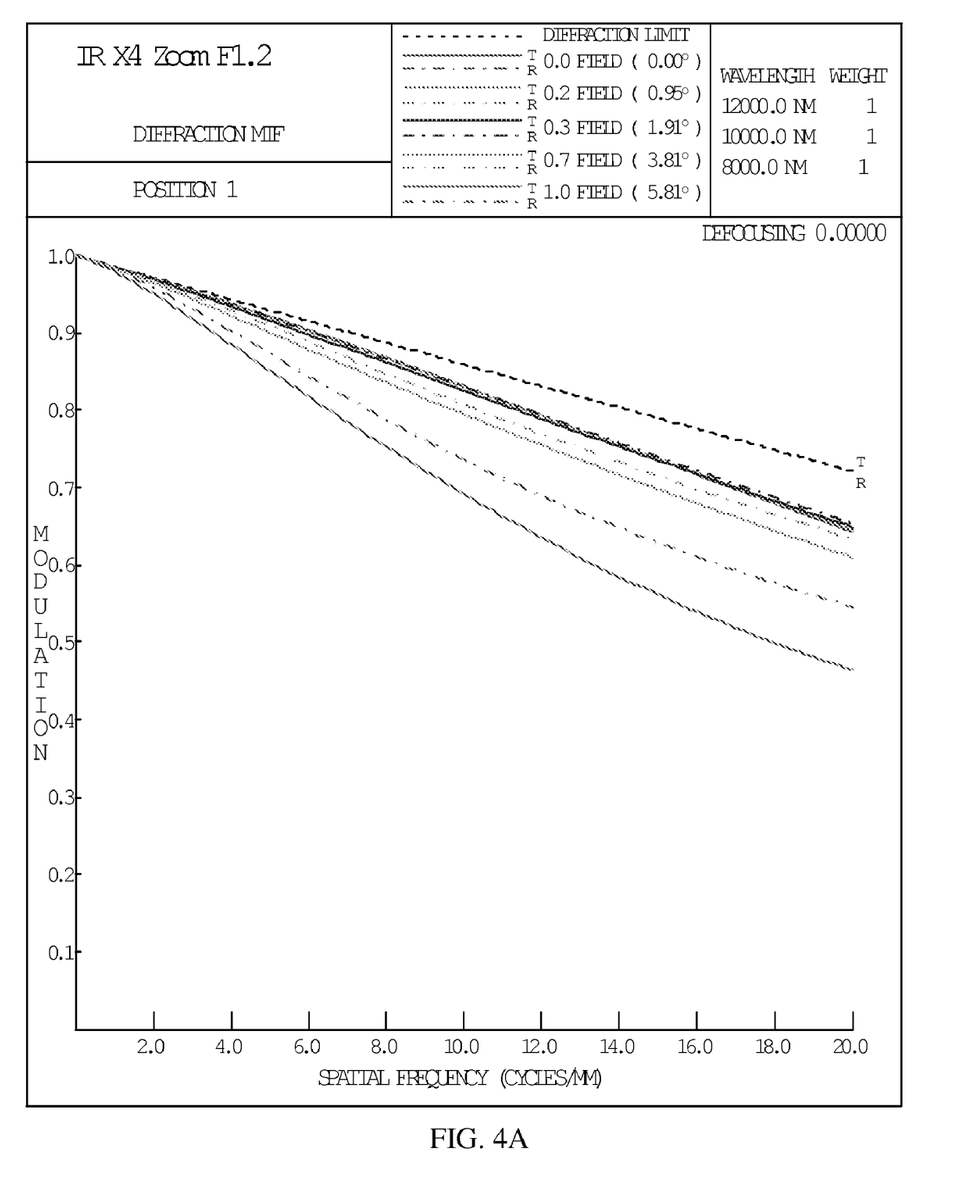
FIGS. 4A-4E are MTF graphs of the zoom lens of FIG. 1 at different zoom positions.
Figure 4B:
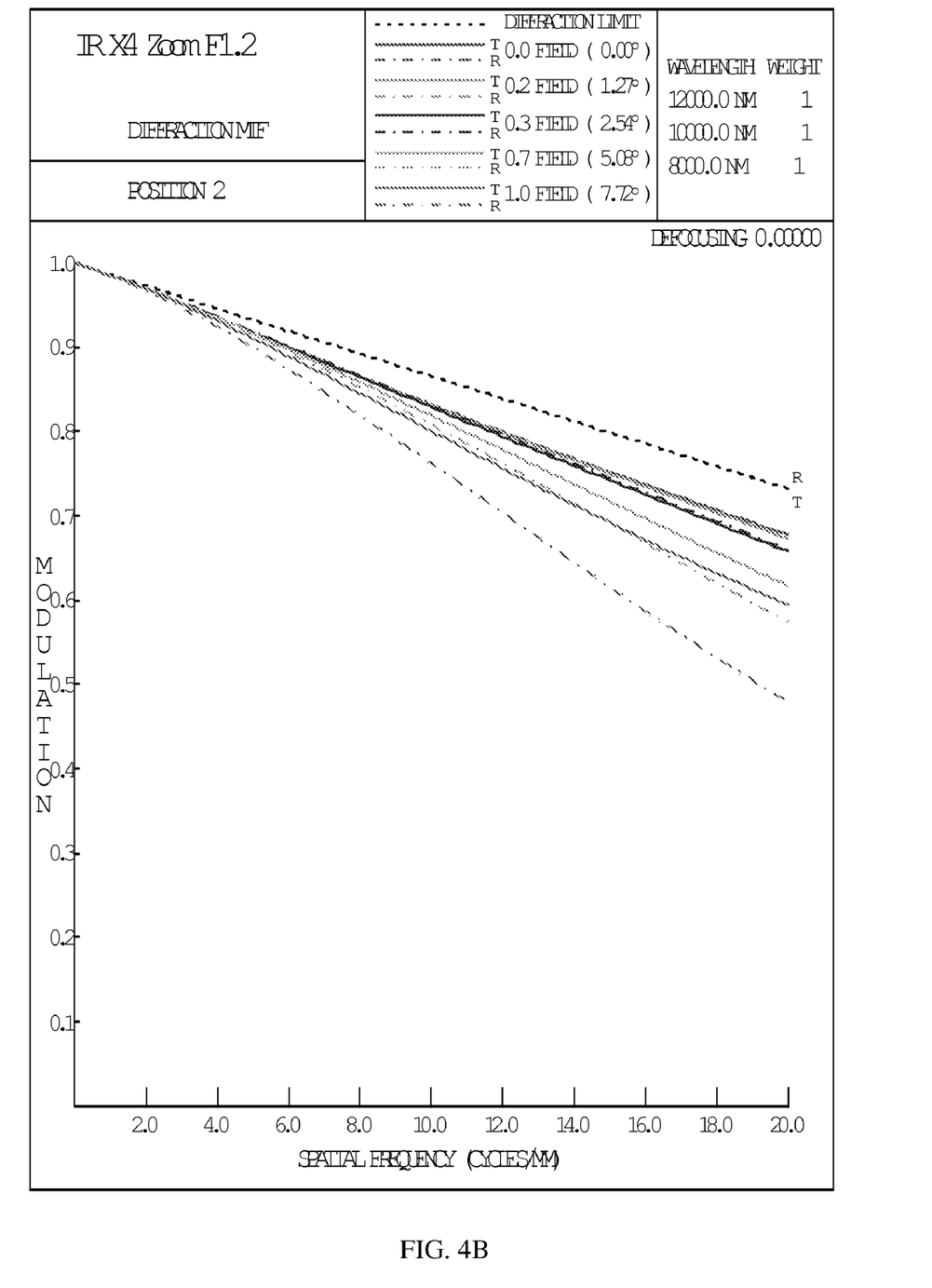
Figure 4C:
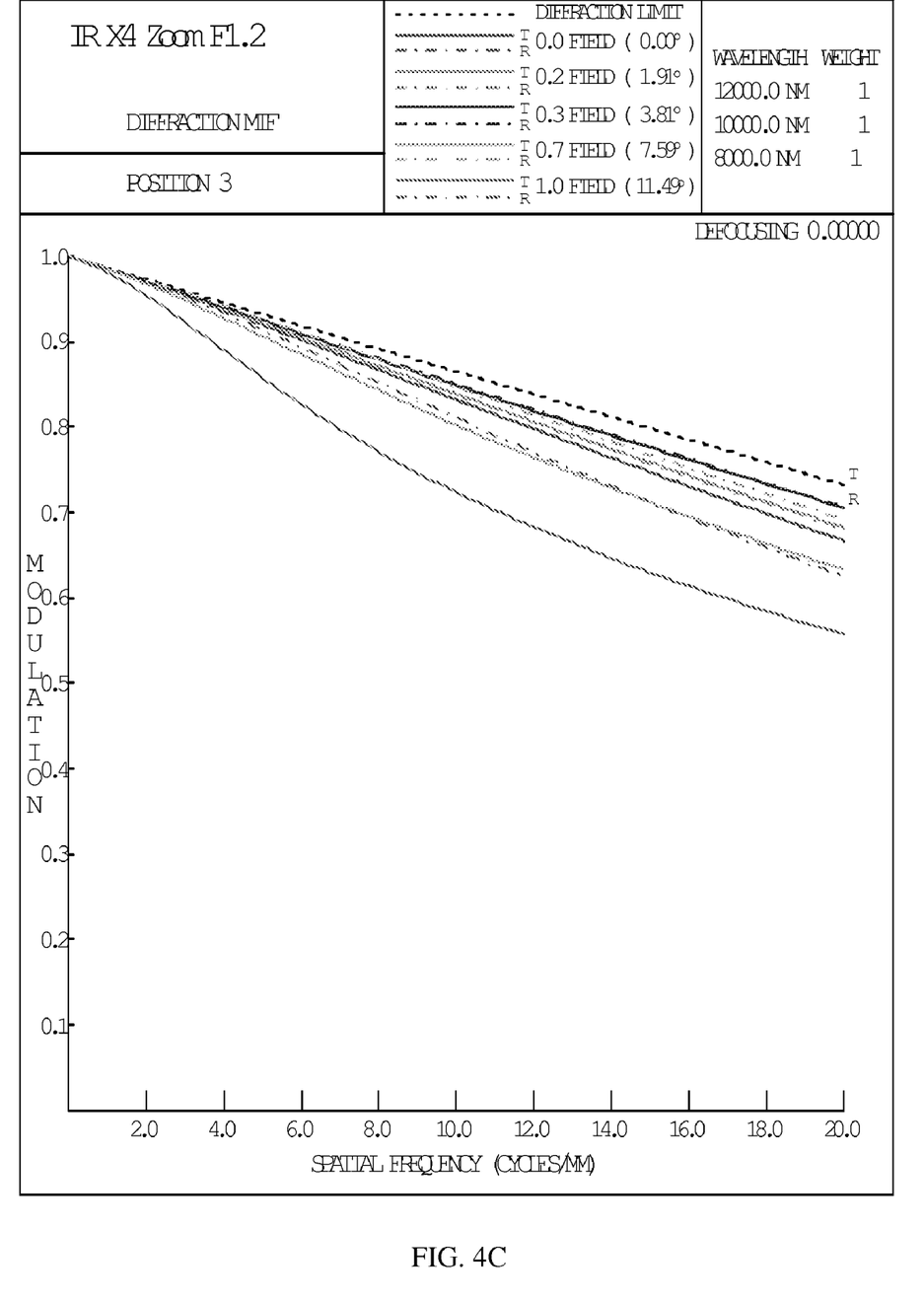
Figure 4D:
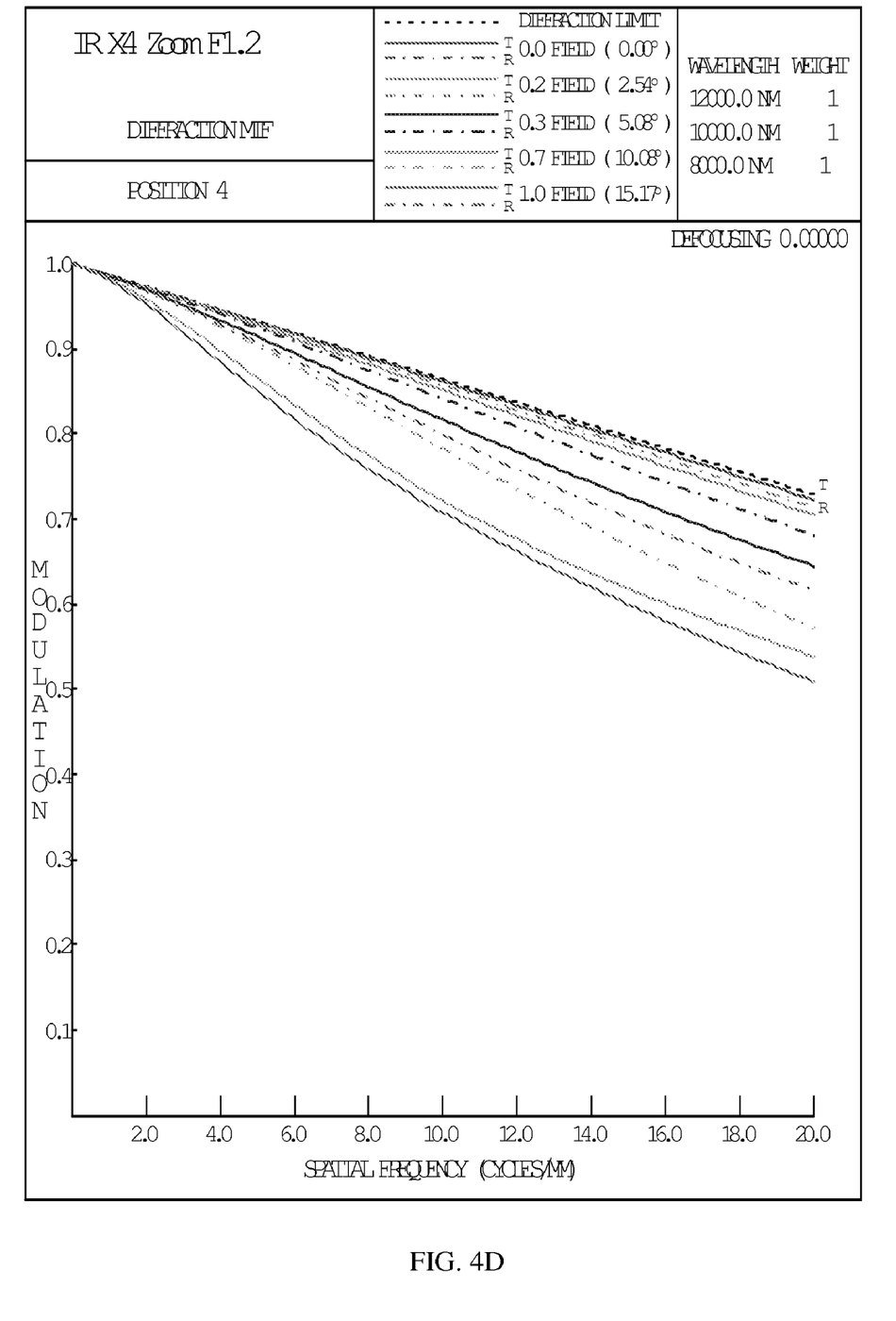
Figure 4E:
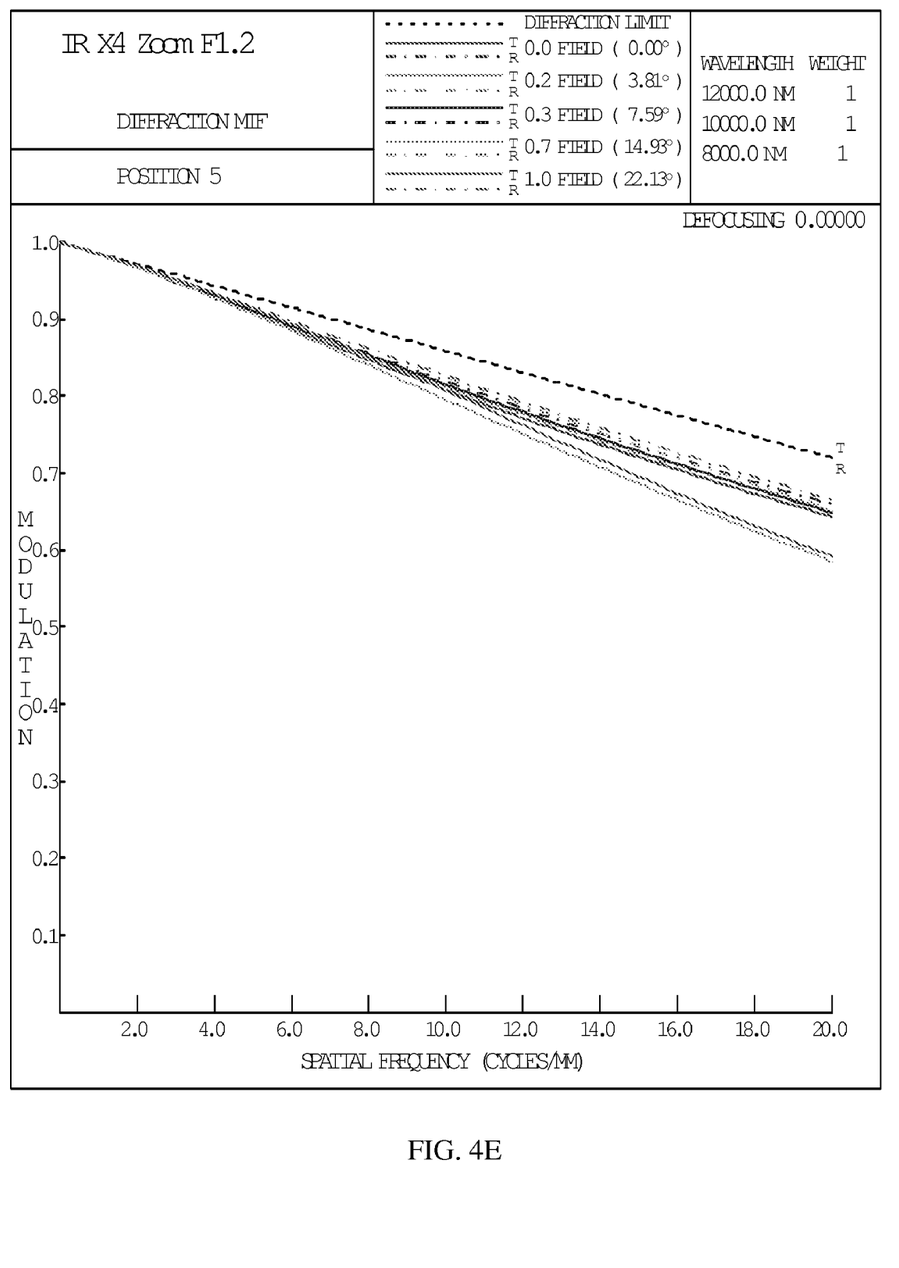

FIG. 4A shows the movement curve of lenses 2 and 4 with respect to the focal length of the short length zoom lens.

In a non-limiting embodiment, an aperture stop 6 is mounted between the second side of lens 2 and the first side of lens 3. The aperture stop 6 is stationary. The location of the aperture stop 6 minimizes the front lens diameter and allows the short length lens assembly to have a constant, very fast F/Number. Accordingly, there is no change in sensitivity throughout the zoom range. As used herein, the phrase "fast F/Number" means a F/Number of less than 1.4. For the embodiment shown in FIGS. 2A-2E, the F/Number may be approximately 1.2 throughout the zoom range.

The short length zoom lens be constructed of a single material having infrared transmitting properties at the far infrared wavebands. Germanium is preferred because of its high refractive index and very low dispersion. This makes it is easier to correct for image aberrations, such as spherical chromatic aberrations, astigmatism and others.

In the basic construction according to the present invention, the short length zoom lens satisfies the following conditions.

$1.5 > T/f > 1.3$ $0.7 > Ts/f > 0.5$ $1.8 > (D*FN)/f > 1.2$ $6 > X > 3$

Wherein

T—is the total length of the system, measured from the first surface of lens 1 to the image plane 5, along the optical axis 15 f—is the longer focal length of the short length zoom lens, that is, the focal length at the extended position shown in FIG. 2E Ts—is the distance between the first surface of lens 1 to the aperture stop 6

D—is the diameter of the first lens 1

FN—is the F number of the short length zoom lens

X—is the focal length ratio between the longer focal length f and the shorter focal length, the shorter focal length being at the retracted position shown in FIG. 2A The focal length of the individual lenses satisfies the following conditions:

$1 > FL1/f > 0.6$ $0.25 > -FL2/f > 0.1$ $0.6 > FL3/f > 0.4$ $0.5 > FL4/f > 0.3$

Wherein

FL1—is the focal length of the first positive lens 1
FL2—is the focal length of the second negative lens 2
FL3—is the focal length of the first positive lens 3
FL4—is the focal length of the first positive lens 4
f—is the larger focal length of the short length zoom lens It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. An infrared lens system comprising:
   a focus section that focus infrared radiation at an image plane; and
   a zoom section that adjusts a desired focal length of said infrared radiation, said focus section and zoom section comprising a plurality of lenses which are located along an optical axis in optical communication with each other, said focus section and zoom section each comprising a fixed lens fixed with respect to the optical axis and a movable lens arranged for movement along the optical axis, wherein the lenses of said zoom section satisfy the following conditions:

$1.5 > T/f > 1.3$ $0.7 > Ts/f > 0.5$ $1.8 > (D*FN)/f > 1.2$ $6 > X > 3$

Wherein
- T—is a total length of said lens system, measured from a first surface of said fixed lens of said zoom section to the image plane along the optical axis
- f—is the longer focal length of said zoom section at a fully extended position of said zoom section
- Ts—is the distance between the first surface of said fixed lens of said zoom section to an aperture stop
- D—is the diameter of said fixed lens of said zoom section
- FN—is the F number of the infrared lens system
- X—is the focal length ratio between the longer focal length f and the shorter focal length at a fully retracted position of said zoom section.

2. The infrared lens system according to claim 1, wherein said aperture stop is fixed along the optical axis.

3. The infrared lens system according to claim 2, wherein said aperture stop is supported on one of said lenses of said focus section, and wherein said aperture stop has an F/number which is less than 1.6.

4. The infrared lens system according to claim 1, wherein said lenses each have aspheric surfaces thereon.

5. The infrared lens system according to claim 1, wherein said fixed lens of said zoom section is a positive converging lens, and said movable lens of said zoom section is a negative diverging lens.

6. The infrared lens system according to claim 1, wherein said fixed lens of said focus section is a positive converging lens, and said movable lens of said focus section is a positive converging lens.

7. The infrared lens system according to claim 1, further comprising an aperture stop fixedly supported on one of said lenses of said focus section.

8. An infrared lens system comprising:
- a focus section that focus infrared radiation at an image plane; and
- a zoom section that adjusts a desired focal length of said infrared radiation, said focus section and zoom section comprising a plurality of lenses which are located along an optical axis in optical communication with each other, said focus section and zoom section each comprising a fixed lens fixed with respect to the optical axis and a movable lens arranged for movement along the optical axis, wherein the focal lengths of the lenses satisfy the following conditions:

$1 > FL1/f > 0.6$ $0.25 > -FL2/f > 0.1$ $0.6 > FL3/f > 0.4$ $0.5 > FL4/f > 0.3$

Wherein
- FL1—is the focal length of said fixed lens of said zoom section
- FL2—is the focal length of said movable lens of said zoom section
- FL3—is the focal length of said fixed lens of said focus section
- FL4—is the focal length of said movable lens of said focus section
- f—is the longer focal length of the infrared lens system at a fully extended position of said zoom section.

9. The infrared lens system according to claim 8, further comprising an aperture stop which is fixed along the optical axis.

10. The infrared lens system according to claim 9, wherein said aperture stop is supported on one of said lenses of said focus section, and wherein said aperture stop has an F/number which is less than 1.6.

11. The infrared lens system according to claim 8, wherein said lenses each have aspheric surfaces thereon.

12. The infrared lens system according to claim 8, wherein said fixed lens of said zoom section is a positive converging lens, and said movable lens of said zoom section is a negative diverging lens.

13. The infrared lens system according to claim 8, wherein said fixed lens of said focus section is a positive converging lens, and said movable lens of said focus section is a positive converging lens.

14. The infrared lens system according to claim 8, further comprising an aperture stop fixedly supported on one of said lenses of said focus section.

* * * * *